UNITED STATES PATENT OFFICE.

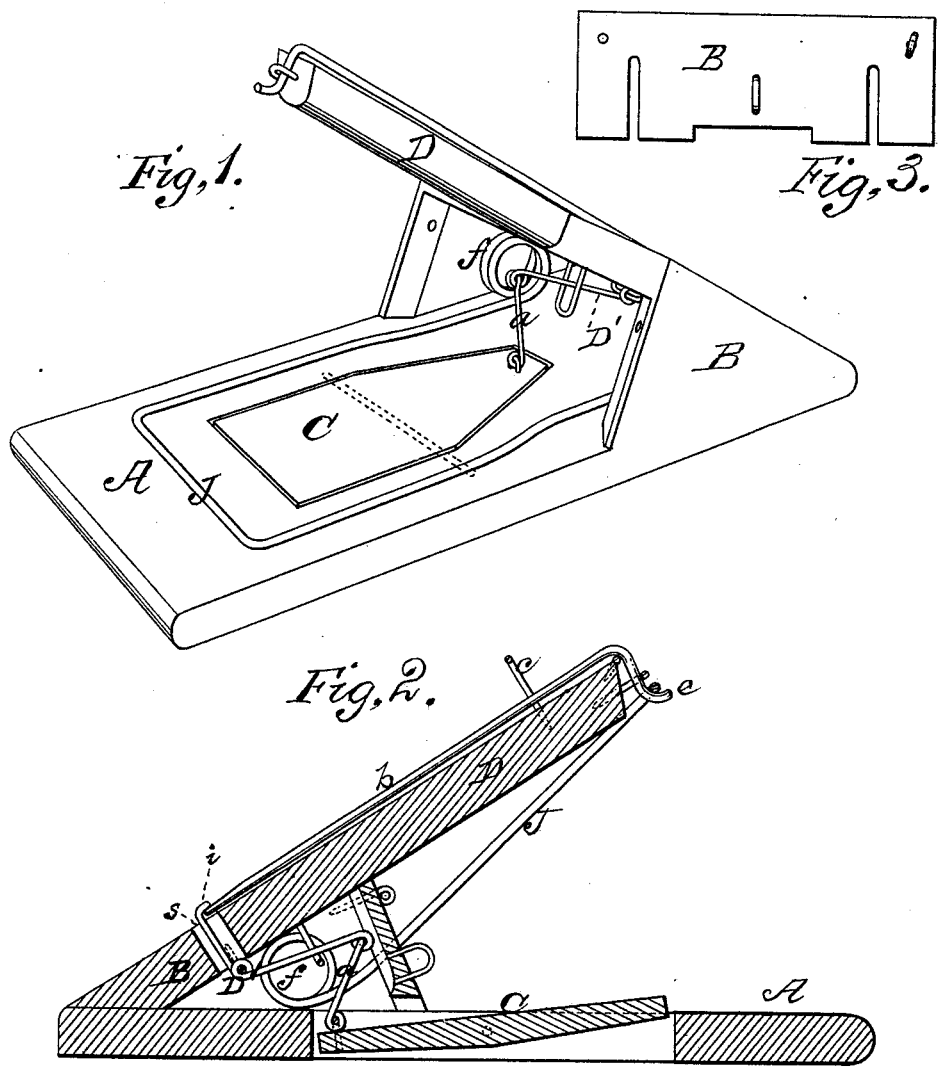

JOHN LEIBOLD, OF DELAWARE, OHIO.

IMPROVEMENT IN ANIMAL-TRAPS.

Specification forming part of Letters Patent No. 219,959, dated September 23, 1879; application filed May 24, 1879.

*To all whom it may concern:*

Be it known that I, JOHN LEIBOLD, of Delaware, in the county of Delaware and State of Ohio, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved trap. Fig. 2 is a longitudinal vertical section thereof, and Fig. 3 is a detail.

This invention has for its object the improvement of animal-traps.

The nature of the invention consists in the combination with a base having a housing and a projecting beam, and a platform vibrating in an opening in said base, of an angular lever pivoted to the housing, and having its hooked arm extending through a slot of the housing-roof, a link-bar, a latch-bar having an arm, and a striking-bail secured to the housing-roof and having spring-coils, as hereinafter shown and described.

In the accompanying drawings, the letter A designates the base of my improved trap, the same being of rectangular form and of suitable dimensions. At one end of this board is a casing or housing, B, of a wedge form, and in its central portion a vibrating platform, C. D indicates a beam projecting in an oblique position from the top of the casing over the platform. These parts constitute the body or frame of the trap.

D' indicates an angular vertically-vibrating lever, fulcrumed at its bend in the under side of the top of the casing, and having one arm working through a slot, s, formed therein. The other arm is connected to the adjacent end of the platform by a coupling-bar, a, flexibly jointed to both the lever and platform, so that when the latter is vibrated by an animal passing onto it the former is also vibrated, and its hooked end i disengaged from a latch-bar, b, extending from slot s through a guide, c, along beam D to its free end, thence downward across the end of said beam, and terminating in a short projecting arm, e.

The platform, link-lever, and latch-bar may be appropriately called the "let-off mechanism."

J indicates a metallic bail of the form of the letter U, and provided near the ends of its legs with the spring-coils f. The ends of the legs are carried through the top of the casing, and are clinched or otherwise secured thereto.

The normal position of the striker-bail when not set is flat upon the base A, as shown in Fig. 1, and completely surrounds the platform.

The trap is set by raising the latch-bar, lifting the striker forcibly, engaging the latter with arm e of the former, and the heel of said bar with the hook i, of the angular lever D' and is let off by the weight of the animal as he steps upon the platform.

This trap may be of various sizes, according to its use, and it operates to kill or disable by the force of the blow given by the striker, as well as to hold the animal when captured.

What I claim as new, and desire to secure by Letters Patent, is—

In an animal-trap, the combination, with a base having a housing, B, and a projecting beam, D, and a platform, C, vibrating in an opening in said base, of an angular lever, D', pivoted to the housing, and having its hooked arm i extending through a slot, s, of the housing-roof, a link-bar, a, a latch-bar, b, having an arm, e, and a striking-bail, J, secured to the housing-roof and having spring-coils f, substantially as specified.

In testimony that I claim the above I have hereunto subscribed my name in the presence of two witnesses.

JOHN LEIBOLD.

Witnesses:
J. J. REICHERT,
C. H. MCELROY.